July 20, 1965 R. G. PAPELIAN 3,196,431

ENCODING APPARATUS

Filed Nov. 21, 1962 2 Sheets-Sheet 1

INVENTOR
ROGER G. PAPELIAN
BY
Rosen & Schiller
ATTORNEYS

July 20, 1965 R. G. PAPELIAN 3,196,431
ENCODING APPARATUS
Filed Nov. 21, 1962
2 Sheets-Sheet 2

INVENTOR.
ROGER G. PAPELIAN
BY
Rosen & Schiller
ATTORNEYS

United States Patent Office 3,196,431

Patented July 20, 1965

3,196,431
ENCODING APPARATUS

Roger G. Papelian, Milford, Mass., assignor to Computer Control Company, Inc., Framingham, Mass., a corporation of Delaware Filed Nov. 21, 1962, Ser. No. 239,185
7 Claims. (Cl. 340—347)

This invention relates to encoding devices and more particularly to improvements in digital shaft angle encoders.

Digital shaft angle encoders have been widely employed to provide accurate indications of relative angular positions between elements in terms of digital signals adapted, for instance, for direct input to digital data processing equipment. Most such encoders employ a disk mounted on and rotatable with a shaft whose angular position is to be measured. The disk is characterized in having a plurality of annular, concentric information channels or tracks of different radii, the tracks being digitally coded in a repetetive symmetrical code, for instance, in binary code. Operation of optical encoders of this type are based upon coded modulation of radiation, as by transmission of light through permeable or transparent areas in a disk where coding is in the form of light-opaque and permeable areas. Typically, an optical encoder of the prior art employs a radiation source for illuminating an area lying along a predetermined radius of a coded disk. Light is transmitted through the transparent portions of the disk lying along that radius, and passes through a radially disposed optical slit to finally impinge upon photoelectric means responsive to the presence or absence of illumination. The output of the photoelectric means is then amplified by appropriate means to provide an electrical digital code functionally related to angular shaft position.

The number of concentric tracks on the disk is determined by the desired degree of resolution of the encoder. For example, if a full rotation of the shaft is divided into only 8 quanta expressed in binary notation as bits, then only 3 tracks are necessary ($2^3=8$), and the degree of resolution is $2^3$. Each binary number would then represent a discrete shaft position within 45°. Similarly, and more practically, it if is desired to divide the entire 360° of shaft rotation into 8,192 equal parts, then 13 tracks would be necessary ($2^{13}=8,192$). In this latter instance, each part would represent an angular measurement of approximately 2.6 minutes of arc. Thirteen track encoder disks of 3½" diameter are common. Instruments claiming $2^{18}$ resolution in a 10" diameter have also been made.

Conventional practice has been to provide disks in which the coding takes the form of alternating opaque and transparent areas or segments in each track, the radial dimension or width of all tracks being the same. The relation of the groups of segments of each track with respect to the next adjacent tracks, in terms of number, position and angular dimension, is determined by the particular coded function employed. For instance, standard practice is to provide the track of greatest radius (i.e. the outermost track) with the code grouping representing the group of least significant digits (LSD), each track of next successive smaller radius having the group of next more significant digits, until the track of least or shortest radius contains the group of most significant digits (MSD). Thus, when coded in binary notation, the innermost track contains the digits of the largest power ($n$) of 2, the next outer track the digits of the $n-1$ power, and so on until the outermost track then contains the digits of the least power of 2, all as well known in the art. Conventionally it is preferred to employ Gray code (sometimes known as reflected or cyclic binary code) to reduce possible ambiguous indication of shaft position, inasmuch as the numbers in the Gray code only change one bit at a time.

The optical slit employed with standard optical encoders has a substantially invariant or fixed width which is usually less than the width of an LSD segment in the outermost track. Because the slit width is typically quite fine, practical manufacturing requirements have limited the form of the slit to the fixed width type. However, certain errors are inherent in this type of structure. For instance, referring particularly to FIG. 1 there is shown a portion of the prior art encoder structure heretofore described including fixed with slit 20 and the edges 22 and 24 of two coded segments on respectively different tracks of a part of disk 26, the dimensions being exaggerated for the sake of clarity and the edges for sake of simplicity both being shown as abutting the slit. It can be assumed, for explanatory purposes, that slit 20 is wholly exposed by transparent segments of the different tracks adjacent the position of both edges 22 and 24, and that light is traversing the slit after passage through the transparent segment superimposed thereon. Both edges 22 and 24 are, in accordance with standard practice, radially directed from the center of rotation 28 of the disk. Edge 22 is disposed on a track having an arbitrary radius ($R_2$) from the center of rotation and edge 24 is disposed on another track having an abitrary radius $R_1$ from the center of rotation where $R_2>R_1$. Hence, the encoder is fully "on" with respect to the coded segments respectively having edges 22 and 24. In order for the encoder to go from the "on" to the "off" condition with respect to the coded segment having edge 22, the latter must be moved through an angle 30 to bring the opaque area adjacent edge 22 completely across slit 26 and cut off the light. The relation of the change in light level (i.e. light traversing the slit at the intersection of the latter with the track having edge 22) with respect to the angular movement of edge 22 is shown graphically in FIG. 2 as curve 32.

However, referring again to FIG. 1, it will be seen that if edge 24 is moved through the same angle 30, the opaque area adjacent edge 24 cannot completely cover the width of slit 20. Therefore, the level of illumination traversing the slit at the intersection of the latter with the track having edge 24 cannot go from full "on" to full "off." Instead a large angular movement is required to effect the transition from "on" to "off." The relation of the change in light level with angle for edge 24 is shown graphically at 34 in FIG. 2. Comparison of curves 32 and 34 in the latter figure indicates that, for a fixed width slit, the transition from full "on" to full "off," for a coded segment, and vice versa, has a median slope which is a function of the radius of the track in which the particular coded segment is located. As the radius increases, the median slope becomes greater in absolute value. Hence, a transition differential exists between all of the tracks of the disk. Due to this large transition differential between tracks, the control of all component tolerances which affect angular accuracy of the ultimate read-out signal to within ±1 bit accuracy, particularly as is required with the unambiguous Gray code, has been onerous and difficult.

Typically, optical encoders of the type heretofore described also employ for amplifying the output of each photocell detecting the light tranversing each track, a "threshholding" amplifier which operates only when its input is above a preset electrical signal level from its associated photodetector. At or below that level, signals will not appear in the amplifier output. This serves to reduce the possibility of ambiguity in output signals. Obviously, such amplifier inputs must be set well above the noise of the circuit. Usually all such amplifiers in a given encoder are set at the same approximate threshhold value.

In place of fixed width slit 20, an optical encoder according to the present invention employs a V-shaped slit having radially disposed sides approaching a minimum width near the center of rotation of the disk, and having a maximum width of less than the circumferential extent of a bit or half of an LSD segment. This when used with a disk having its LSD segments on inner tracks with increasingly more significant digits coded on outer tracks, will effect fairy uniform light-signal vs. shaft-angle slopes regardless of track radius. However, where, as in conventional disks, the tracks all have equal radial dimensions, the level of the light passed through the slit at full "on," would diminish very nearly proportionally with the decrease in slit width so that, at the intersection of the slit with the innermost track (for disks of 3 to 4 inch diameter, for instance), the light intensity would be below the threshold level of the amplifiers and the more significant digits could not be read out. Thus, while a V-shaped slit would seemingly solve the problem of transition differentials between tracks by providing a substantially constant transition slope regardless of track radius, the light intensity passed by the slit would decrease for some applications to unusably low levels as a function or decreasing track radius and at the point where the more significant digits occur.

A principal object of the present invention is therefore to provide an optical shaft position encoder in which the transition slope and "on" light level derived from each track is substantially uniform thereby endowing optical encoding disk structures with substantially increased accuracy. Other objects of the present invention are to provide an improved optical shaft position encoder of the type described by which uniform or minimum transition slopes and light levels are derived by use of a novel combination of disk and slit configurations; to provide such an encoder in which increased resolution of the function expressed therein is obtained by including a disk having a plurality of annular concentric tracks of different radii wherein the outermost track is coded with the group of most significant segments, each successive track of lesser radius having a coded group of lesser significant segments, the innermost track having the LSD code group; to provide an encoder of the type described in which the optical slit is formed either as a simulated or true V-slit; to provide an encoder of the type described wherein said V-slit cooperates with a disk in which the tracks have different radial dimensions according to a predetermined order; and to provide an encoder of the type described which is capable of very highly improved accuracy and resolution yet is simple to manufacture and assemble.

Other elements and their novel coaction as well as further objects and advantages of the present invention will in part appear obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and operation of the invention, reference should be had to the following detailed description taken in connection with the accompanying drawings in which.

Generally, the present invention contemplates an encoder, such as an optical shaft angle encoder, having a novel disk which includes a coded configuration differing radically from the prior art in that, for instance, when the disk is coded in Gray code, the LSD code segments of dimensions of the novel disk are spaced about the innermost track, with the more significant digit code segments being distributed in groups in sequence upon successive tracks in order of the increasing magnitude of the mean track radii, and in which disk two or more of the track widths are unequal in predetermined order. The disk is therefore "inside out" with respect to disks of the prior art. The present invention in another aspect also employs, in conjunction with the novel disk, a novel optical slit configuration which will be described in detail hereinafter.

As will be seen, through the incorporation of these two novel elements in place of the standard disk (having LSD segments in an outer track) and the standard fixed width slit, substantially increased accuracy and resolution in encoding can be realized over encoders having prior art disks of similar diameter.

Figures 1, 2, 3:
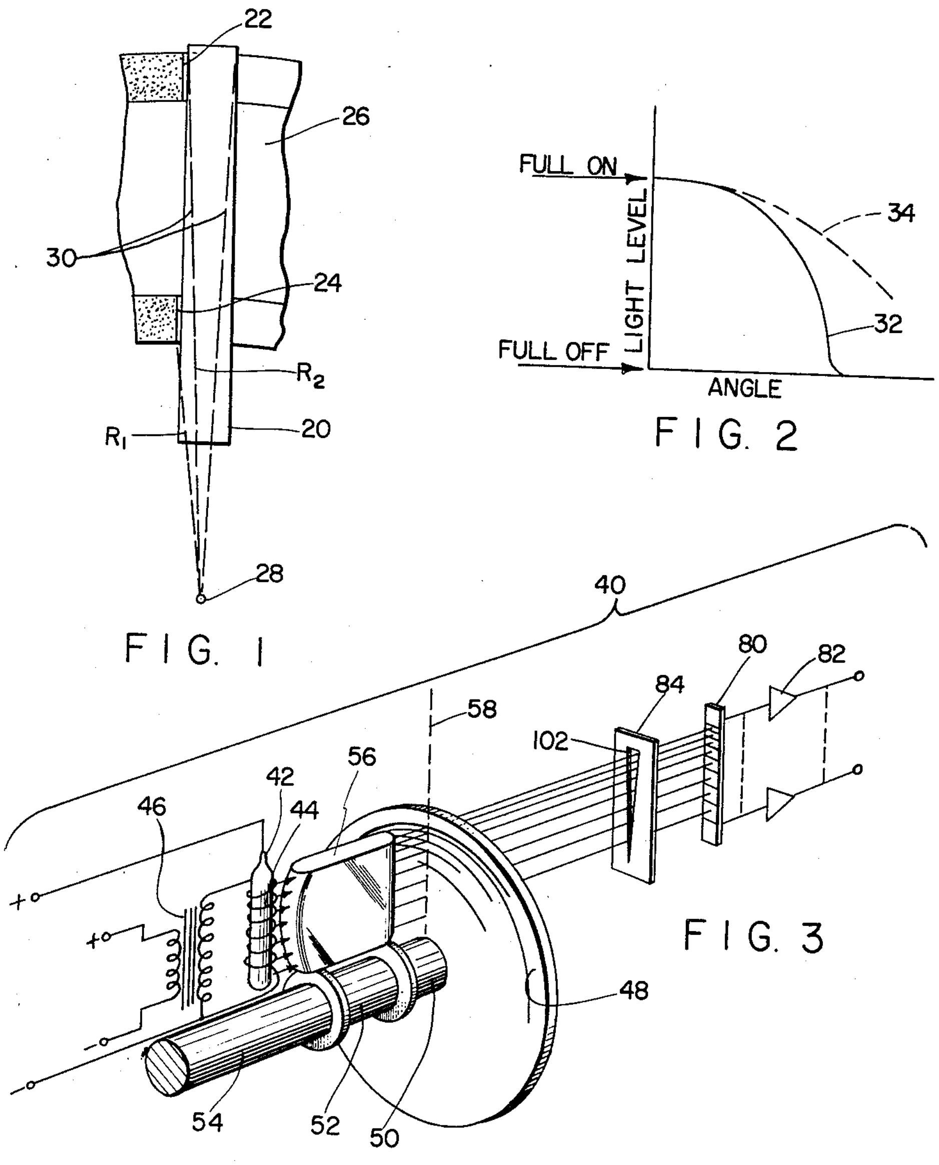
FIG. 1 is a fragmentary diagrammatic representation of the fixed width slit of the prior art and its relation to coded segments on selected tracks of an encoder disk.
FIG. 2 is a graphical representation of illumination vs. angle relationships of coded segments of different tracks shown in FIG. 1.
FIG. 3 is a schematic representation of one embodiment of the present invention.

Referring now specifically to FIG. 3 there will be seen an encoder apparatus, indicated generally at 40, embodying the principles of the present invention. Apparatus 40 includes an illumination source such as flash lamp 42. The latter, for instance, may be a standard xenon-filled tube wrapped in coil 44, the coil being connected to a readout "trigger" and the tube electrodes across a potential of, for example, 300 volts. Flash lamp 42 can be triggered to provide a light pulse by insertion of a trigger command of a few volts to the primary of transformer 46, the secondary of the transformer being connected across coil 44, all as well known in the art. Alternatively, other illumination sources, either pulsating to provide flashes of predetermined duration at fixed or varying intervals, or continuous in nature may be provided in accordance with the desired read-out format.

Apparatus 40 also includes coded substantially planar disk 48 mounted on shaft 50 for rotation with the latter and in the plane of the disk, the configuration of the disk being described hereinafter. Shaft 50 includes means such as bearings 52 for precisely mounting shaft 50 coaxially and concentrically with shaft 54, the angular displacement of the latter being the parameter which it is desired to measure and convert into digital signals.

Apparatus 40 also preferably includes means, such as optical element 36 disposed between lamp 42 and coded disk 48 for collimating the light from the flash lamp and directing the collimated light upon a predetermined radially disposed area of one side of disk 48. In the form shown, optical element 56 is an anamorphic lens formed of a transparent solid material such as glass, plastic, or the like, having surfaces thereof curved in known manner to accept light from a substantially linear (as distinguished from point) source of light and collimate such light to direct it substantially perpendicularly to an elongated planar area lying along a fixed line 58 which is radial with respect to disk 48.

Other optical collimating devices of known structure may also be employed depending upon such factors as the available space, the nature of the illuminating radiation, and the geometry of the illumination source.

Disk 48 is an element having a pair of substantially planar and parallel faces. As shown in fragmentary detail in FIG. 4, the disk includes a plurality of annular concentric information channels or tracks such as 60, 62, 64, 66, 68, 70, 71 and 72. Each individual track has a predetermined radial width and is of a different mean radius. Each track bears coded informaton in the form of a number of signal directing segments of two types, for example alternating radiation permeable and opaque angular segments such as 74 and 76, having radially disposed, substantially straight edges. Each track is divided into a number of such segments in accordance with the particular function encoded thereon. Where the radiation employed is visible light, for instance, the disk may be formed of a light transparent glass, the opaque segments being formed as a coating on one disk surface, for example, of metal deposited as by photographic techniques, vacuum deposition through a mask, or the like. In the present invention, outermost track 72 i.e. the track of greatest radius is divided into segments representing the most significant digits of the code, each track of next successive smaller radius being divided into the coded segments representative of each successive group of next lesser significant digits. Thus, track 60 of least or shortest radius is divided into the group of least significant digits in the form of code segments.

Figure 4:
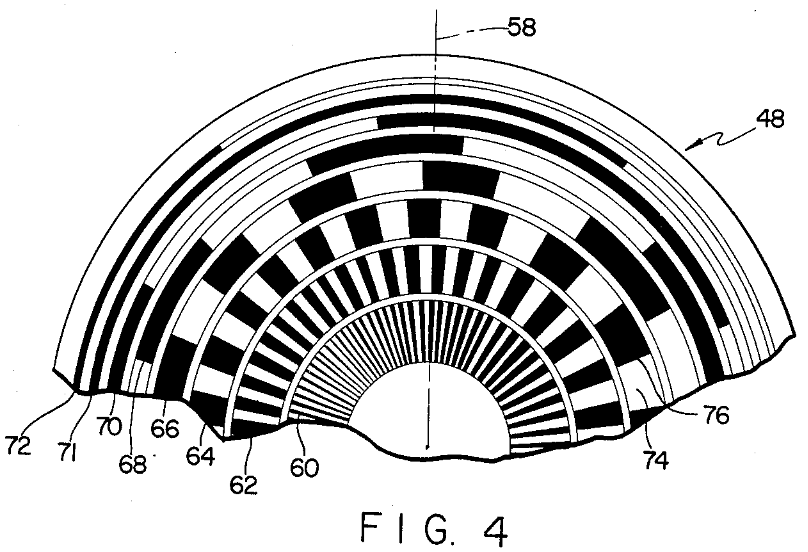
FIG. 4 is a fragmentary plan view of an exemplary coded disk of the embodiment of FIG. 3 showing coding details omitted in the latter figure, the angular relationships and dimensions being exaggerated for clarity in description.

As heretofore explained, the disk is preferably coded in Gray code so that in a sequential change from any code number to any next adjacent number, the change requires that only one digit or bit of the number be altered. The disk shown in FIG. 4 is illustrated as being so coded and it will be seen that the innermost or LSD track 60 contains a large number $n$ of coded segments, track 62 next adjacent thereto therefore contains $n/2$ code segments each of which occupies a circumferential dimension approximately twice the angle subtended by an adjacent code segment of track 60. Similarly track 64, next outermost to track 62, has coded segments of $n/4$ in number, each of which then occupies an arc subtending approximately 4 times the angular dimension of an adjacent code segment of track 60. It will be observed that in order to provide but a single digital change for any position of disk 48, any edge of any coded segment of a given outer track bisects one code segment of each of the inner tracks. For proper coding the entire outermost or MSD track 72 is divided into only two segments, one transparent and the other opaque. Next track 71 is also divided into only two segments, one of which is transparent, the other of which is opaque, these segments being phase-displaced from the segments of track 72. Track 70, next innermost from track 71, is divided into four coded segments, two transparent and two opaque. Track 68 will then be divided likewise into 8 segments; track 66 into 16 segments; track 64 in 32; track 62 into 64; and track 60 into 128. The ultimate number of segments in the LSD track of any such disk will be therefore $2^{x-1}$, where $x$ is the number of tracks and hence a whole number.

Now, if the encoded function is linear, all segments of a given tracks are equiangular or of the same circumferential dimension. On the other hand, if the function sought to be encoded is non-linear, it may be represented by providing for at least a portion of a given track, a number of segments each having a unique or different angular dimension. By coding in this fashion, Gray code can be used. Alternatively, a non-linear function can be expressed in equiangular segmentation of each track, but the numbers of segments in adjacent tracks are then related according to a power of the radix, which power is not a whole number. This would preclude the use of Gray coding. Such encoding techniques are well known in the art. The disk shown in fragment in FIG. 4 therefore illustrates a typical non-linear function in Gray code, the angular dimension of segments included within a 90° quadrant for a given track all being of unequal values varying according to a non-linear function e.g. a sine function. In the disk of FIG. 4, it will be noted also that the width of each track is determined as an inverse function of the mean radius or radial order of the track. Hence, the track of great mean radius or outermost track 72 has the smallest width. In the preferred form, each track of successively smaller mean radius is of corresponding greater width than the next outermost track.

Encoding disks of this type are applicable also to solve similar problems arising in non-optical encoders, such as the brush and magnetic types as well as multiple track incremental encoders as distinguished from absolute (e.g. shaft angle) encoders.

As means responsive to light transmitted through selected transparent code segments of disk 48 and for translating the intermediate light into electric signals, there is provided a plurality of photoelectric elements 80 of known structure. The latter are in a predetermined array such as a column disposed parallel to line 58 on the other side of the disk from optical element 56. The predeterminded array is arranged so that each discrete one of elements 80 thereof is positioned in the path of light which may be transmitted through a corresponding one of the tracks of disk 48. Elements 80 may be either photoresistive or photovoltaic depending upon the desired response. For example, whether lamp 42 is a xenon-filled flash lamp which is to be pulsed and therefore requires about 3 microseconds to reach ⅓ peak intensity, or a continuous source, the response time of elements 80 is sometimes quite important and elements 80 are preferably formed of silicon photovoltaic cells. The latter are preferred because of their fast rise-times of approximately 1 microsecond or better. If, on the other hand, slow rates of information may be used or lesser information per size is required, slower time responsive but greater light-sensitive elements 80 may take the form of photoresistive or photoconductive devices such as known photodiodes, photo-transistors or the like, having quite small sensitive areas (in the order of $1\times10^{-3}$ in.$^2$) for comparatively large sensitivities (for instance, about 1 or 2 amps./lumen).

The invention also preferably includes means, such as "thresholding" amplifiers 82 having their inputs coupled to the outputs of respective ones of elements 80, for amplifying the electrical output of each of the latter so that the electrical signals are adapted for input to any of several known read-out devices. When there is one of amplifier 82 for each of elements 80, the output of the encoder is parallel i.e. all of the digital bits representative of a given shaft position being available simultaneously at the amplifier outputs. However, as will be apparent to those skilled in the art, the output of elements 80 can be multiplexed into a single amplifier for serial data recovery. In the event lamp 22 is operated continuously rather than on a pulsating basis, the read-out command may be employed to actuate, for instance, the amplifier's output.

Disposed between the array of elements 80 and code disk 48 is means, such as slitted plate 84, for limiting the light transmitted through each track of the disk to a restricted area on a surface of a corresponding one of elements 80.

Figure 5:
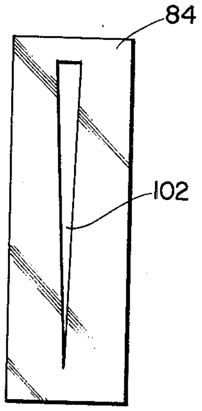
FIG. 5 is a detailed plan view of an exemplary optical slit structure forming a part of the embodiment of FIG. 3, angular relationships and dimensions also being exaggerated.
Figure 6:
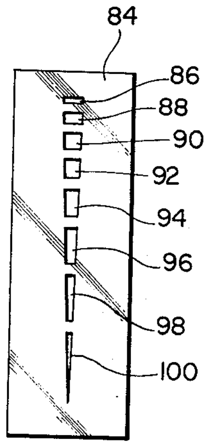
FIG. 6 is a plan view of another exemplary optical slit structure with exaggerated relationships.

One form of plate 84, shown in detail in FIG. 6 is a substantially planar elongated element formed of material, such as metal or glass with an opaque coating of metal, paint, or the like. A plurality of radiation permeable elongated openings including such slits as 86, 88, 90, 92, 94, 96, 98 and 100 are disposed lengthwise and spaced along a line such as the axis of elongation of plate 84 to form a novel optical slit configuration which is termed herein a "simulated-V." Plate 84 is so disposed in apparatus 40 that its plane is substantially parallel with the plane of disk 48 and the line of slits along its axis of elongation is parallel with predetermined line 58. Each of the slits heretofore described has disposed in alignment with light transmitted therethrough, a corresponding one of the tracks of the disk. For instance slit 86 is aligned with the light transmitted through the intersection of track 72 and line 58. Slit 88 is aligned thusly with track 70, slit 90 with track 72 and so on. Slit 86 which then corresponds to outermost or MSD track 72 is dimensioned in width to provide an acceptable transitional slope which is such that the angular change required by the entire transition between the "off" and "on" states is one bit or less than half the width of an LSD segment on track 60. Slit 86 is also dimensioned in length corresponding to the width of track 72; thus the area of slit 86 allows an adequate amount of light therethrough to stimulate the corresponding one of elements 80. Slit 88 corresponding to the next-to-outermost track 71, is dimensioned in width to provide a transitional slope of approximately the same magnitude, and in length corresponding to the width of track 71 hence is slightly narrower and longer than slit 86. Each successive slit in the sequence is similarly proportioned to lesser width and greater length. It will be seen that the width and length of each slit are determined in accordance respectively directly and inversely with the mean radius of the particular track corresponding thereto. Thus, the level of light of given intensity tranmissible by the slits in the sequence will remain the same or at least above a predetermined minimum for each slit area. This configuration, which extends from slit 86 positioned adjacent MSD track 72 to slit 100 positioned adjacent LSD track 60, will in effect duplicate the V-shaped slit shown in FIG. 5.

Another form of plate 84 is shown in FIG. 5 wherein the group of slits of the embodiment of FIG. 6 have been replaced with a single true V-shaped slit 102. Slit 102 is dimensioned at its wider end similarly to the width of slit 86 of FIG. 6, and at its narrowest end similarly to the width of slit 100 of FIG. 6. The center line of slit 102 is positional parallel to radial line 58 in the assembled apparatus with the narrower end of slit 102 adjacent innermost disk track 60. The slit length is sufficient to extend from the inner to the outer track of the disk. The slitted plate of FIG. 5 is shown installed in the apparatus of FIG. 3.

In operation, lamp 42 is excited to emit radiation, it being understood that while the usual construction will employ visible light as the radiation, the invention is not necessarily limited thereto. The light provided by lamp 42 illuminates optical element 56 which collimates the light and directs the latter in substantial parallel rays to radius 58 of disk 48. Within the resolution of disk 48, for each discrete angular position of the latter established by the rotation of shaft 54, there will exist a unique coded array of track segments lying along radius 58. This can readily be accomplished by coding the disk in one of many codes such as straight binary or Gray. For the angular relationship of disk 48 shown in FIG. 4 with respect to radius 58, light can traverse track 72 because a permeable segment intersects radius 58. Hence, light is transmitted through slit 102 to the one of elements 80 corresponding to track 72, and an electrical signal is introduced to the corresponding one of amplifiers 82. This can be interpreted as the equivalent of either one of the two binary numbers, but the "signal" condition will be considered herein to be the equivalent of the binary ONE. However, light impinging on track 71 is not transmitted therethrough because a light-opaque segment is shown at the respective track-radius intersection. No light then being transmitted by slit 102 so as to fall upon a respective one of elements 80 corresponding to track 71, no electrical signal is introduced to the appropriate amplifier. This then corresponds to a binary ZERO. It will be seen by examining FIG. 4 that light impinging on the disk along radius 58 and perpendicular to the plane of the disk should provide an electrical output which takes the binary form 10000010.

Regardless of whether the configuration of FIG. 5 or FIG. 6 is employed as the V-slit configuration, it cooperates with the tracks of the disk to pass radiation which will be a substantially uniform quantity for each track, or will be at least above a predetermined minimum. This is insured by providing, with respect to each track, at least a minimum radiation passing area defined by the cooperation between track and slit dimensions. Hence, it will be seen that the structure of the present invention provides a device in which a substantially uniform transition slope and a corresponding minimum radiation quantity is provided with respect to light traversing each track. This device can be employed with particular benefit with respect to coded non-linear functions.

It will be apparent that if the non-linear function according to which the disk is coded is a trigonometric function (such as the sine of the shaft angle) that the apparatus can readily be modified to read out the cofunction (such as the cosine) from the same disk and, if desired, simultaneously with the first function. This may be accomplished simply by providing means for directing radiation perpendicularly to a fixed second line which is radial with respect to disk 48 and is orthogonal to radial line 58. Of course, a second V-slit and corresponding arrangement of photo detector would also be provided for use with the light traversing the disk along the orthogonal radial line.

While the invention has been described in connection with an optical element 56, the latter is not necessary to its operation inasmuch as it is possible to place lamp 42 in a position sufficiently distant from disk 48 that the light from the lamp is approximately collimated. However, the use of a collimating element provides significant advantages. Where the lamp is in close proximity to the disk, serious problems can arise; for instance, detectors usually generate low level signals in the order of millivolts. In optical encoders where several kilovolts are required to trigger the lamp and hundreds of volts are switched, the noise level substantially limits accuracy, reliability, or both. This requires proper radiation shielding, dressing of leads and other precautions in order to gain maximum light intensity from close proximity at tolerable noise levels.

The invention has heretofore been described in connection with encoders based upon the transmissiveness of segments of a coded disk. However, as is well known in the art, encoders can be made in which the coding function of the disk is accomplished by reflection. For instance, the track segments are formed as alternating radiation reflective and radiation absorbent areas. In such case, the light source is placed so that an elongated area lying along a radius of the disk is illuminated with light directed at an angle to the plan of the disk and the photoelectric detectors are then disposed in the path of the reflected radiation.

Alternatively, the disk can be in a conical form and the coded reflective and absorbent segments disposed on the conical face. This too will provide reflection away from the light source according to the angle of the cone. Consequently it will be seen that as used in the claims hereinafter, the term "radiation-directing" is intended to include both reflective and transmissive qualities, while the term "radiation-absorbing" is intended to cover either radiation opaqueness as distinct from radiation transmissiveness or radiation absorbency as distinct from radiation reflectiveness. It will be appreciated that in transmissive or permeable, or reflecting processes that there is always some attenuation; the terminology used is intended to include such instances.

Likewise, opacity and absorbency are usually relative, there being some small transmission or reflection, as the case may be, in many instances. In any of these processes or conditions however, the small deviation from absolute conformity is considered immaterial.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Optical encoding apparatus comprising:
a radiation source;
means responsive to radiation from said source;
a code delement rotatably mounted for selectively directing said radiation so as to actuate discrete portions of said radiation-responsive means in accordance with the angular position of said element;
said element having a plurality of concentric annular tracks thereon;
each track being divided into a respective plurality of alternating first signal-controlling and other signal-controlling segments according to a function expressed as a predetermined digital code;
at least one track of radius greater than the track of least radius being divided into segments corresponding to the most significant digits of said code;
at least a track of lesser radius than said one track of greater radius being divided into segments corresponding to lesser significant digits of said code;
each of said tracks having a radial dimension predetermined inversely according to the mean radius; and
means positioned between said element and said radiation-responsive means, for limiting radiation transmitted through selected segments of each track to respective ones of said discrete portions and coacting with each of said selected segments for providing to each of said respective portions a radiation quantity above a predetermined magnitude and for providing a transition slope above a predetermined minimum.

2. Optical encoding apparatus as defined as claim 1 wherein said means for limiting radiation comprises a radiation opaque member having at least radiation-permeable portions therein each of which is positioned in the path of radiation from a respective one of said tracks, the width of each of said portions being a function of the mean radius of the respective track corresponding thereto.

3. Optical encoding apparatus as defined in claim 1 wherein said means for limiting radiation comprises a radiation-opaque member having an open V-shaped slit therein, said slit being so disposed that the narrow end thereof is adjacent the innermost track of said disk and the wider end thereof is adjacent the outermost track of said disk.

4. Optical encoding apparatus as defined in claim 1 wherein said means for limiting radiation comprises a radiation-opaque member having therein a plurality of elongated radiation-permeable slits;
said plurality of slits comprising a sequence of individual slits each being disposed in the path of radiation from a respective one of an adjacent number of said tracks so that the first of said individual slits corresponds to the track of greatest mean radius and the other of said individual slits each corresponding to respective successive tracks of lesser radius of said number, the width of each of said individual slits being a function of the means radius of the respective track corresponding thereto.

5. Optical encoding apparatus as defined in claim 4 wherein the axis of elongation of all of said slits lie along radially directed lines from a common center.

6. Optical encoding apparatus as defined in claim 4 wherein the dimensions of each of said slits is selected so that the total area of each is above a predetermined minimum.

7. Optical encoding apparatus comprising:
a light source;
photoelectric means responsive to light from said source;
a coded disk rotatably mounted for selectively directing light from said source so as to actuate portions of said photoelectric means in accordance with the angular position of said disk;
said disk having thereon a plurality of concentric annular tracks;
each track having a radial dimension predetermined inversely according to its mean radius;
each track being divided into a respective plurality of alternating light-permeable and light-opaque segments according to a predetermined function expressed as a digital code;
the track of least radius having its plurality of segments corresponding to the least significant digits of said code;
each track of successively larger radius having its plurality of segments thereof corresponding to respective successive groups of more significant digits of said code;
the track of greatest radius having its plurality of segments corresponding to the most significant digits of said code;
means for collimating light from said source and for directing the collimated light to a fixed elongated area lying substantially radially along one side of said disk; and
means for limiting the light transmitted through selected permeable segments of the respective tracks of said disk to respective discrete portions of said photoelectric means such that the light transmitted thereby from any one of said tracks to the corresponding portion of said photoelectric means is above a certain predetermied level and the mean slope of the transition of the transmitted light level between full magnitude and substantially zero magnitude effected by a predetermined angular movement of the disk is not less for any of said tracks than a predetermined minimum.

References Cited by the Examiner

FOREIGN PATENTS 650,913 3/51 Great Britain.

MALCOLM A. MORRISON, *Primary Examiner.*